United States Patent
Jones

[15] 3,702,604
[45] Nov. 14, 1972

[54] WORK MOUNTING MECHANISM IN SLICING MACHINE

[72] Inventor: Don R. Jones, Wayne, N.J.

[73] Assignee: Silicon Technology Corporation, Oakland, N.J.

[22] Filed: May 20, 1971

[21] Appl. No.: 145,225

[52] U.S. Cl.........................125/14, 51/73 R, 83/240, 83/414, 83/915.5, 83/925, 269/56, 269/60
[51] Int. Cl.........................B23d 45/08, B23d 47/04
[58] Field of Search.....83/915.5, 925, 240, 247, 251, 83/268, 280, 412, 415, 646, 647.5, 490, 414; 51/73 R; 125/13, 13 SS, 14; 269/56, 60

[56] References Cited

UNITED STATES PATENTS

| | | | |
|---|---|---|---|
| 3,154,990 | 11/1964 | Woods | 83/251 X |
| 3,117,398 | 1/1964 | Meyerhoff | 51/73 |
| 3,662,733 | 5/1972 | Okamoto | 125/13 R |

FOREIGN PATENTS OR APPLICATIONS

| | | | |
|---|---|---|---|
| 914,965 | 1/1963 | Great Britain | 125/14 |

Primary Examiner—Andrew R. Juhasz
Assistant Examiner—James F. Coan
Attorney—Amster & Rothstein

[57] ABSTRACT

A machine for slicing wafers of brittle material from an ingot in which the ingot to be sliced is secured for stepwise movement into the path of a rotating saw blade which moves through a slicing path perpendicular to the direction of movement of the ingot. The mounting means for the ingot includes a way table mounted on a fixed base for movement between a cutting position adjacent said saw blade and a clearance position away from the said saw blade. Positive stop means define the cutting position of the way table such that the ingot can be moved away from the saw and back to the saw with an accurate repositioning of the ingot in its cutting position. A variety of adjustable mounting means are provided to mount the ingot on the way table whereby the ingot may be oriented vertically, horizontally and axially for proper angle of cut.

6 Claims, 5 Drawing Figures

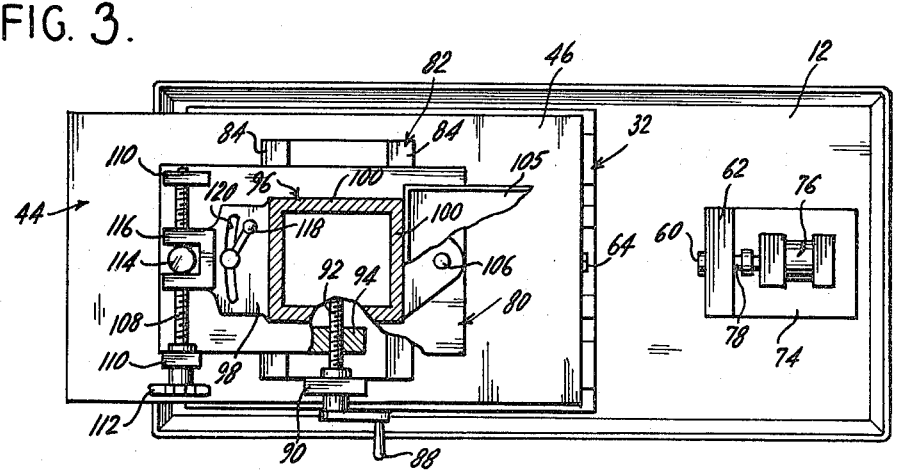
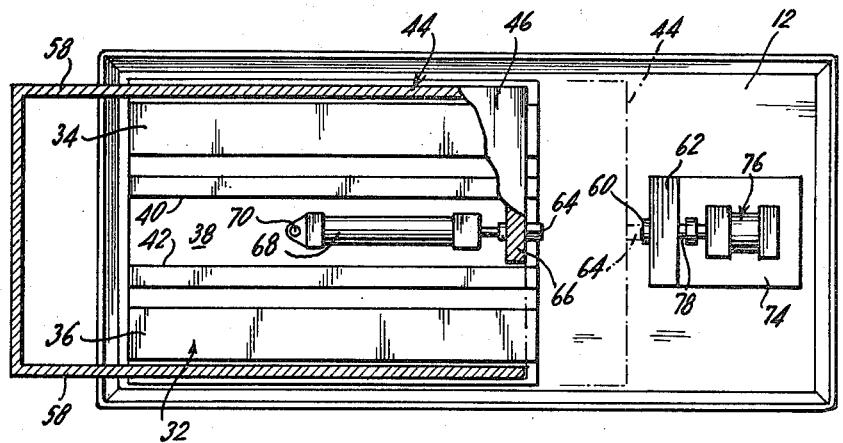
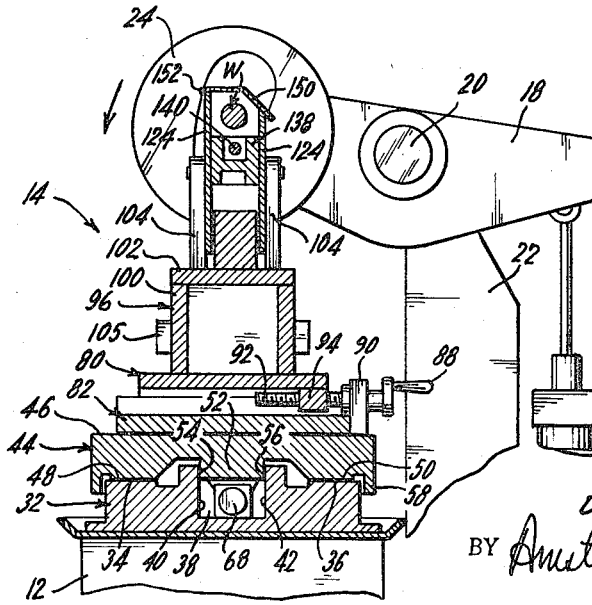

WORK MOUNTING MECHANISM IN SLICING MACHINE

The present invention relates generally to production machinery and specifically to an improved slicing machine specifically intended to slice ingots of brittle, difficult to cut material such as silicon.

The use of silicon wafers in the electronics industry has become widespread for a number of different commercial and technological purposes. These wafers are extremely thin, typically in the order of 0.007 inches in thickness, and may range upwards in size to a diameter of approximately three inches. Such wafers are cut from ingots of crystal material which have been grown specifically for the purpose of providing material to be cut into individual thin wafers. Uniformity of size and surface of the cut wafers is extremely important and thus it is extremely important to provide a machine which can repeatedly cut wafers of desired precise thickness and with smooth, unscarred surfaces. It also is extremely important to provide a machine to produce such wafers which minimizes the breakage problem which existed in the prior art slicing machines, which minimizes waste ingot material and which is an easy machine to operate. Furthermore it is desired to have such a slicing machine in which there is easy access for the operator to inspect and work and specifically the end of an ingot mounted in the machine as well as the various moving parts of the machine such as the saw blade, etc. While providing these desirable characteristics, it is of utmost importance that a slicing machine be capable of repeatedly slicing wafers from an ingot which are uniform in thickness, of high surface quality and which provides efficient manufacturing operations.

Accordingly, it is an object of the present invention to provide an improved machine for the slicing of brittle crystalline material. Specifically, it is a contemplation of the present invention to provide an improved means for mounting work in such a machine which will enable the work to be efficiently sliced to produce good, clean, usable wafers and which, at the same time, is convenient to use and which allows access to the work and mechanism during the manufacturing operations.

In accordance with one presently, preferred illustrative embodiment of the invention, there is provided a machine for slicing thin wafers of brittle material from an elongated ingot which incorporates a new and improved work holding, alignment and feeding mechanism. The machine is of the type including a saw blade mounted in an arm which moves the saw blade through vertical slicing movements at the same time that the blade is rotated about its central horizontal axis. Typically, the saw blade is of an ID or internal diameter type. The work holding, alignment and feeding mechanism comprises a base which is the same base which supports the saw blade mounting arm. A main way table is mounted on the base for linear, generally horizontal movement below and parallel to the central axis of the saw blade and between a precisely defined cutting position and a clearance position. In turn, an intermediate table is mounted on the main way table and includes means to allow it to be moved in a generally horizontal movement in a direction perpendicular to the central axis of the saw blade. A work mounting unit is secured to the intermediate table for pivotal movement about a generally vertical axis, i.e., an axis perpendicular to the central axis of the saw blade, and includes means for adjusting the orientation of the main work mounting unit about that axis.

An ingot box is then mounted upon the main work mounting unit for adjustable movement and includes means to adjust the orientation of the ingot box on the main work mounting unit about a generally horizontal axis perpendicular to the center line of the saw mounting blade. The front to rear adjustment of the main work mounting unit and the adjustment about the horizontal pivot of the ingot box allows for adjustment of the work to be cut relative to the saw blade. The means mounting the main way table on the base provides for an extremely precise movement. Stop means are provided to define the cutting position and actuating means are provided to move the main way table between the cutting position against that stop and the clearance position at which a machine operator can service the machine.

The above brief description, as well as further objects, features and advantages of the present invention will be best understood by reference to the following detailed description when taken together with the accompanying drawings wherein:

FIG. 3 is a sectional view taken along the line 3—3 of FIG. 2 looking in the direction of the arrows;

FIG. 4 is a sectional view taken along the line 4—4 of FIG. 2 looking in the direction of the arrows including a dotted line showing of the main way table in its cutting position; and FIG. 5 is a sectional view taken along the line 5—5 of FIG. 2 looking in the direction of the arrows.

Figure 1:
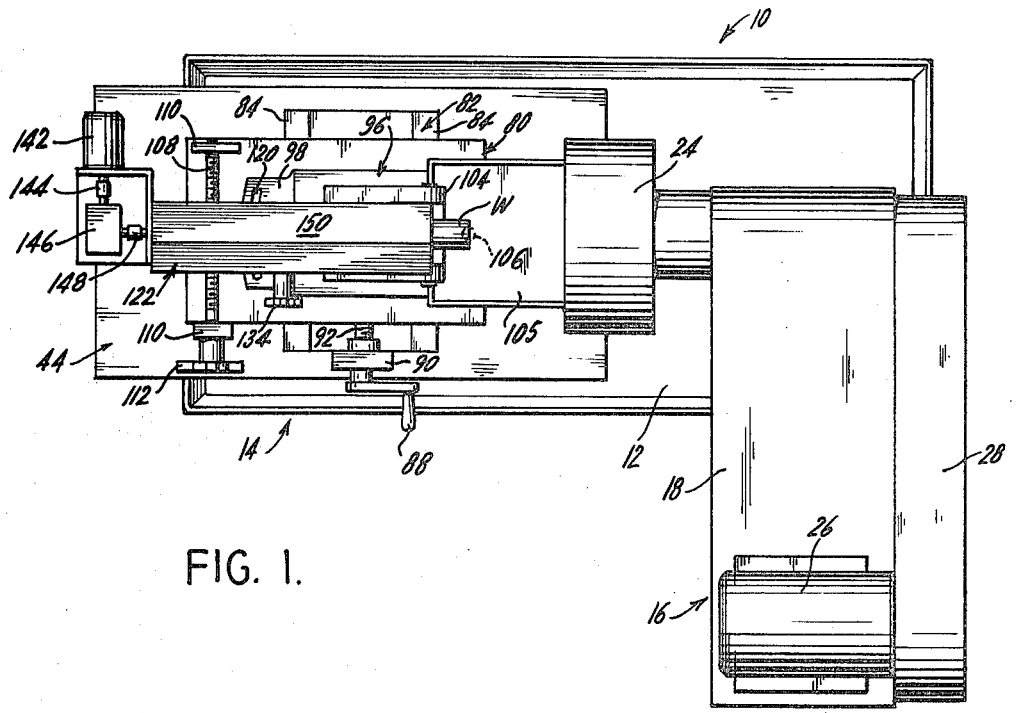
FIG. 1 is a plan view of a machine incorporating the inventive features of the present invention.
Figure 2:
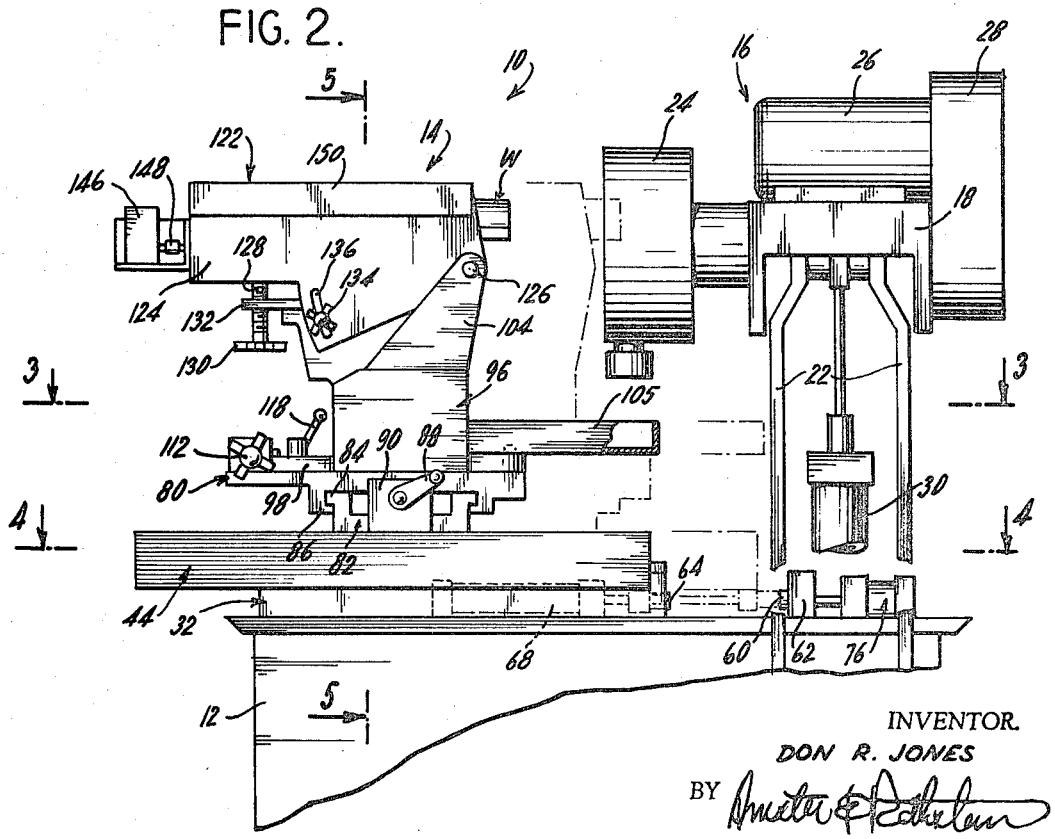
FIG. 2 is a front elevational view of the present invention, with some portions broken away for the sake of clarity, with the mechanism shown in its clearance position in full line and shown in its cutting position in dotted line.

In FIGS. 1 and 2, there is fully shown a slicing machine generally designated by the numeral 10 which includes a base 12 upon which are mounted the operative elements of the slicing machine 10. There are two major parts to the machine: the work holding and feeding mechanism which is generally designated by the numeral 14 mounted on the left hand side of the base 12 and the saw mechanism 16 mounted on the right hand side of the base 12.

The saw mechanism 16 comprises a beam 18 mounted at a central pivot 20 (see FIG. 5) on an upstanding support arm 22 secured to the base 12. At one end of the beam 18, there is a saw blade housing 24 which shields the typical ID saw blade, bearing means, etc. At the other end of the beam 18, there is mounted a motor 26 which powers the rotation of the saw blade through appropriate mechanisms contained within the transmission housing 28 along the side of the beam 18. The beam 18 is driven through a cutting or slicing motion about its pivot 20 by means of the piston and cylinder assembly 30 connected to the outer end of the beam 18. When the piston and cylinder assembly 30 expands, the forward end of the beam 18 moves up thus moving the rearward end of the beam down which carries the saw blade through its downward cutting stroke. Reference to FIG. 5 will show the relationship of the downward movement of the saw blade, indicated in that drawing by a curved arrow, relative to a work piece W mounted in the work holding and feeding mechanism 14. The saw blade housing 24 has an appropriate cut out to provide sufficient clearance for the work W as the beam 18 and saw blade are moved through the cutting stroke, however, the housing provides a splash shield for the cutting fluid as well as a safety shield for operator protection.

It is the function of the work holding and feeding mechanism 14 to mount an ingot of crystalline material, here designated by the letter W, and to mount it in position for optimum slicing efficiency. Exact orientation in a number of different directions is required. The work holding and feeding mechanism positions the work W at the proper front and rear position, at the proper angle measured in a vertical plane and at the proper angle measured in a horizontal plane. Furthermore, the work holding and feeding mechanism 14 in accordance with the present invention provides for movement of the entire mechanism and the work W from the cutting position shown in dotted line configuration in FIG. 2 to the clearance position shown in solid lines in that figure.

The base 12 supports a base way 32 rigidly mounted thereon. The base way, best seen in FIG. 5, has a pair of finely ground upper supporting and guiding surfaces 34, 36 along each of its side edges, and a central channel 38 running down its length, the sides of which form a pair of accurately polished side guiding surfaces 40, 42. These upper guiding surfaces 34, 36 and side guiding surfaces 40, 42 provide the accurate mounting base of the machine base 12 on which the work holding and feeding mechanism 14 finds support. A main way table 44 having a generally rectangular overall shape and flat rectangular upper surface 46 is mounted on the base way 32 and is provided with an undersurface having carefully ground and polished surfaces complimentary to the guiding surfaces 34, 36, 40, 42. Specifically, the main way table is formed of flat horizontal support surfaces 48, 50 complimentary to the surfaces 34, 36 and is formed with a central rib 52 the side edges of which have guiding surfaces 54, 56, complimentary to the side guiding surfaces 40, 42. A shielding skirt 58 is formed around the edges of the main way table 44.

The main way table 44 is moved from the clearance position shown in solid lines in FIGS. 2 and 4 to the cutting position shown in the dotted lines. The cutting position is defined by cutting position stop 60 rigidly mounted in a stop support 62 which in turn is mounted on the base 12. A complimentary stop contact member 64 is rigidly mounted on the inside end of the main way table 44 at a depending stop-mounting boss 66. A clearance piston and cylinder assembly 68 is mounted at one of its ends on the frame 12 at mounting point 70 and is positioned within the channel 38 of the main base way 32. The piston and cylinder assembly 68 is attached at its other end to the stop mounting boss 66 on the way table 44 such that upon expansion of the piston and cylinder assembly 68, the way table 44 is moved from its clearance position as shown in full line in FIG. 4 to its cutting position as shown in dotted lines. In the cutting position, the stop contact member 64 is moved firmly and positively up against the stop 60 to provide extremely accurate locating means for precisely and positively positioning the way table 44 at its cutting position. Pressure is maintained within the piston and cylinder assembly 68 during operation of the machine 10 thereby providing a positive force to maintain the way table 44 in the cutting position throughout the operations of the machine 10.

Immediately adjacent the stop 60 and on a supplemental mounting block 74 is an incremental movement piston and cylinder assembly 76. The purpose of the piston and cylinder assembly 76 is to provide for interim small movements of the way table 44 out of the cutting position during selected portions of the operation of the machine 10. Specifically, this mechanism moves the main way table 44 approximately 0.010 inches to the left to allow for reciprocation of the saw blade free of any contact with the end face of the ingot during the withdrawal of the saw blade from the cutting stroke. This operation will be explained in more detail below. The piston of the piston and cylinder assembly 76 is attached to an incremental movement shaft 78 which extends through an opening in the center of the cutting position stop 60. Upon energization of the piston and cylinder assembly 76, the incremental movement shaft 78 pushes through the opening in the cutting position stop 60, engages the stop contact member 64 on the way table 44 and pushes the way table out of the cutting position by an amount approximating 0.010 inches. The force exerted by the incremental movement piston and cylinder assembly 76 is somewhat greater than the force created by the way table piston and cylinder assembly 68, thus producing incremental movement of the way table.

Mounted on the way table 44 is a moveable intermediate table generally designated by the numeral 80. The intermediate table 80 is provided with means mounting it on the main way table 44 for adjustable movement forwardly and rearwardly of the machine 10, that is, for movement in a plane parallel to the top of the way table 44 and in the direction of movement perpendicular to the movement of that way table. Specifically, there is a cross way unit 82 rigidly secured to the upper surface 46 of the main way table 44 which is provided with a pair of outwardly extending shoulders 84. The shoulders 84 are complimentary to undercut slides 86 formed on the under surface of the intermediate table 80 and together, the shoulders 84 and the slides 86 cooperate to provide positive mounting for the intermediate table 86 while allowing front to rear movement with respect to the base 12. That front to rear adjustable movement is controlled by means of a crank and handle 88 which is mounted for rotation on a mounting block 90 and is connected to a threaded shaft 92. The threaded shaft 92 is received within a downwardly depending block 94 which is rigidly secured to the underside of the intermediate table 80. It will be appreciated that upon rotation of the crank and handle 88 and rotation of the threaded shaft 92, the intermediate table 80 will be moved forwardly and rearwardly. Locking means to prevent any such movement may be applied as between the main way table 44 and the intermediate table 80.

The intermediate table 80 provides the mounting base for the main work mounting unit 96 which is mounted thereon for adjustable pivotal movement about a vertical axis. Specifically, the main mounting unit comprises a flat base 98 resting on top of the intermediate table 80, four vertical side walls 100, an upper horizontal block 102 and a pair of upwardly extending side pivot mounts 104. A cutting fluid pan 105 is mounted on the unit 96 and extends under the work W as may be best seen in FIGS. 1 and 2.

The main mounting unit 96, through its base plate 98 is mounted at vertical pivot 106 on the intermediate table 80. At the opposite end of the base plate 98 are positioned guide means to adjust the rotational position of the intermediate mounting unit 96 about a vertical axis through the pivot 106. A threaded shaft 108 is mounted in bearing blocks 110 on the intermediate table 80 and is attached to a turn knob 112. An internally threaded travelling member 114 is positioned about the threaded shaft 108 and is engaged within a bifurcated extension 116 of the base plate 98. Upon turning the knob 112 which produces rotation of the threaded shaft 108, the travelling nut 114 will move from front to rear of the intermediate table 80 thus moving the outside end of the base plate 98 from front to rear causing pivotal movement of the base plate and the entire main work mounting unit 96 about the vertical pivot 106. A locking crank 118 is threaded into the intermediate table 80 and extends upwardly through an arcuate slot 120. Upon clockwise rotation of the locking crank 118, the base plate 98 of the work supporting unit 96 is fixed tightly to the intermediate table 80 precluding any pivotal movement about the vertical axis through the pivot 106.

The main work mounting unit 96 supports an ingot box, generally designated by the numeral 122, on the base 12, through the intermediate table 80 and the main way table 44, and provides for adjustable pivotal movement about a horizontal axis which is perpendicular to the direction of movement of the main way table 44. Specifically, the ingot box 122 is formed with a pair of structural side walls 124 which fit between the upwardly extending side pivot mounts 104 of the main work mounting unit 96. A horizontally oriented pivot 126 extends from front to rear of the machine 10 and pivotally interconnects the mounts 104 and the side walls 124 of the ingot box. Adjustable pivotal movement of the ingot box 122 about pivot 126 is accomplished by means of the adjustment lead screw 128 and the adjustment knob 130 which are vertically oriented in extension 132 of the main work mounting unit 96. The adjustment screw 128 extends upwardly and contacts an under surface of the ingot box 122 such that upon turning of the adjustment knob 130, the screw 128 is moved up or down thereby to cause pivotal movement of the ingot box 124 about a horizontal axis through the pivots 126. The ingot box 122 can be locked into position by means of the locking mechanism 134 which consists of a knob and shaft threaded into the side wall of the main mounting unit 96 and extending through an arcuate slot 136 such that upon clockwise rotation of the locking mechanism 134, the lower portion of the side walls 124 of the ingot box 122 are tightly secured to the main mounting unit 96.

The specific construction of the ingot box 122 and the mechanism by which an ingot is driven in stepwise movement into the cutting path of the saw blade is more completely described in a co-pending application. However, for completeness of disclosure in an amount sufficient for the purposes of describing the present invention, the following materials describe the essential features of the ingot box. The side walls 124 of the ingot box are mounted on a central rigid beam 138 which forms the central core of the ingot box 122. The beam 138 is generally H-shaped in cross section and a feeding screw 140 is mounted within one of the channels of the beam and provides the force to advance the ingot W in stepwise movement into the path of the slicing blade. The advancement screw 140 is driven by a stepping motor 142 through coupling 144 to a gear reduction unit 146 which in turn is connected to the advancement screw 140 through the coupling 148. The stopping motor 142 turns a preselected number of rotations which, through the gear reduction unit 146, turns the advancement screw 140 in amounts sufficient to advance to ingot W the desired distance to cut off a wafer of the desired thickness. If, for example, wafers of 0.007 inches are desired and if the saw blade in use cuts away 0.010 inches of material in each cut, the stepping motor 142 is set to advance the ingot 0.017 for each new cut. A travelling nut (not shown) rides in the channel of the H beam 138 and is threaded about the advancement screw 140. An extension of this nut bears against the back end of the mounting means for the ingot W and drives it forwardly within the ingot box 122. The inside shape of the ingot box provides means to maintain the ingot in proper alignment as wafers are sliced from it and a cover 150, hinged at 152, is provided to protect an ingot mounted within the ingot box.

It will be appreciated if the drive mechanism and the overall design of the mounting mechanisms for the ingot box provides unique and special advantages for slicing ingots into thin wafers. Since the main way table 44 can be backed away from its cutting position stop 60 completely independently of the stepwise advancing means, the operator of the machine can back off the entire work holding unit at any time during operations (except, of course, during an actual slicing) without affecting the accuracy of the next successive cut. For example, if the operator wishes to inspect the cut end face of the ingot W, he simply backs off the main way table 44 by operation of the piston and cylinder assembly 168 to move the assembly into the position shown in solid lines in FIGS. 1 and 2. In that position, as may be readily appreciated, he may inspect the face of the ingot W, he may inspect the condition of the saw blade, he may dress the blade, he may check the condition of the cutting fluid, he may remove foreign material which might be impeding operations within the cutting blade mounting mechanisms, etc. upon completion of these inspection and maintenance operations simply by energization of the main way table piston and cylinder assembly 68, the unit may be advanced into its cutting position and cutting operations continued without any necessity to reset any of the critical parameters. Since the lead or feed screw 140 is not backed off in these manipulations, there is absolutely no play in the advancement of the ingot W, and upon the next subsequent operation of the stepping motor 142, there will be a continued, absolutely precise forward advancement of the ingot W.

The above brief description of the machine 10 may be better understood by considering the following description of operations of the unit. An ingot W, with its customary mounting means, is placed into the ingot box 122 by setting it down onto the locating means provided and closing the cover 150. The proper orientation of the ingot W with regard to the saw blade is accomplished by utilization of the several different adjustment features provided. Assuming that it is desirable to cut the particular ingot in a direction absolutely perpendicular to its own axis, the operator simply first adjusts the front to rear position of the ingot by manipulation of the front to rear adjustment crank and handle 88 which controls the front to rear position of the intermediate table 80 with regard to the main way table 44. The angle of the center line of the ingot with regard to the center line of the saw blade may then be adjusted by loosening the locking crank 118 and adjusting the threaded shaft 108 through the adjustment knob 112 in order to pivot the entire main work carrying unit 96 about the vertical pivot 106. When the proper angle is achieved, the locking crank 118 is tightened to secure the main work mounting unit 96 on the intermediate table 80. The angle of the ingot W in the vertical plane is then adjusted by loosening the locking mechanism 134 and adjusting the threaded adjustment screw 128 by turning the adjustment knob 130. Upon achieving the proper angle, the locking mechanism 134 is engaged. The operator then makes initial cuts to remove the unusable end material from the ingot W. The controls for the machine may then be set to provide continuous slicing operations with continuous stepwise advancement of the ingot W into the slicing path of the saw blade. If desired, the incremental back-off mechanism of the piston and cylinder assembly 76 may be utilized to prevent contact by the saw blade as it is brought through its return stroke. Specifically, in some instances, it may be desirable to preclude contact between the exposed freshly cut face of the ingot W and the saw blade during its return stroke. This is accomplished by energizing the incremental movement piston and cylinder assembly 76 which pushes the shaft 78 against the stop contact member 64 of the main way table 44 and moves it out of the way a few thousandths of an inch.

At any time during the operations of the machine, after the completion of a slice or before the slicing operation is begun, the operator can simply and easily back the entire work mounting structure away from the cutting head in order to inspect or perform maintenance operations on any portion of the machine without upsetting the precisely oriented mechanisms and without adversely affecting the shape, thickness or surface finish of the next successive wafer to be cut. If the operator wishes to inspect the face of the work piece W or to observe the condition of the saw blade, he simply causes the main way table piston and cylinder assembly 68 to contract to the condition shown in FIG. 4 which drives the main way table away from the cutting head, moving all of the mechanisms to the position shown in solid lines in FIGS. 1 and 2.

From the foregoing disclosure, it will be appreciated that there is provided in accordance with the present invention a structure for a slicing machine which provides a high degree of flexibility of operation allowing the operator to perform inspection and maintenance functions without upsetting the precisely aligned, oriented and positioned relationship between the ingot to be cut and the saw blade head. This allows for continuous operation which, if interrupted, may continue on without requirements for resetting the machine. Furthermore, the structures provide an extremely efficient mechanism wherein a high degree of precision in repeatability of wafer thickness and surface finish can be achieved with a minimum of operator attention being paid to the machine.

The above description presents one specific embodiment of the present invention. Design variations of major and minor degree can be made without departing from the teachings of the invention. The scope of the invention is defined by the following claims:

What I claim is:

1. In a machine for slicing thin wafers of brittle material from an elongated ingot, including a saw blade and mounting arm providing for vertical slicing movement of said saw blade while said saw blade is rotated about its central, horizontal axis, a work-holding, alignment and feeding mechanism comprising:
   a. a base;
   b. a main way table;
   c. means mounting said main way table on said base for movement parallel to said central, horizontal axis of said saw blade between a clearance position remote from said saw blade and a cutting position adjacent said saw blade;
   d. ingot mounting means for mounting an ingot on said main way table including stepwise advancement means to advance an ingot into the path of vertical slicing movement of said saw blade;
   e. orientation adjustment means mounting said ingot mounting means on said main way table in a generally horizontal plane generally parallel to the central, horizontal axis of said saw blade for rotational adjustment movement about a vertical axis and about a horizontal axis perpendicular to the central horizontal axis of said saw blade;
   f. actuation means for moving said main way table between said clearance position and said cutting position; and
   g. stop means accurately defining said cutting position and terminating movement of said main way table from said clearance position to said cutting position;

said work-holding alignment and feeding mechanism providing accurate step-wise advancement of an ingot for slicing operations and providing for movement to a clearance position between slicing operations free from any interference with subsequent slicing operations.

2. In a device in accordance with claim 1, an incremental back-off means comprising an incremental movement mechanism operatively engaged with said main way table to move same out of said cutting position by an incremental amount of less than 1 inch between individual slicing cycles.

3. In a device in accordance with claim 2 wherein said incremental back-off means comprises a piston and cylinder assembly and an incremental movement shaft operatively engaged with said stop means for selectively moving said main way table out of said slicing position in an incremental amount.

4. In a device in accordance with claim 1 wherein said orientation adjustment means includes an intermediate table mounted for horizontal movement on said main way table, a vertical pivot mechanism on said intermediate table and a horizontal pivot mechanism operatively interconnected between said vertical pivot mechanism and said ingot mounting means.

5. In a device in accordance with claim 1 wherein said orientation adjustment includes a vertical pivot mechanism operatively mounted on said main way table and a horizontal pivot mechanism operatively interconnected between said ingot mounting means and said vertical pivot mechanism.

6. In a device in accordance with claim 5 wherein said ingot advancement means comprises an electrically energized stepping motor, a lead screw driven by said motor, a traveling nut in threaded engagement with said lead screw, and means interconnecting said threaded nut and an ingot mounted in said device.

* * * * *